United States Patent [19]

Wagner et al.

[11] Patent Number: 4,794,751

[45] Date of Patent: Jan. 3, 1989

[54] SEALING OF APPARATUS WITH CONTINUOUS PRODUCT TRANSPORT

[75] Inventors: Wolfram Wagner; Peter R. Nyssen; Dieter Paulini, all of Dormagen; Dirk Berkenhaus, Cologne; Siegfried Kulisch, Dormagen, all of Fed. Rep. of Germany

[73] Assignee: Bayer Aktiengesellschaft, Fed. Rep. of Germany

[21] Appl. No.: 24,015

[22] Filed: Mar. 10, 1987

[30] Foreign Application Priority Data

Mar. 22, 1986 [DE] Fed. Rep. of Germany ....... 3609858

[51] Int. Cl.$^4$ .......................... D01H 13/28; D02J 1/08
[52] U.S. Cl. ......................................... 57/308; 57/352; 57/908
[58] Field of Search ................. 57/289, 290, 308, 333, 57/350, 351, 355, 246–247; 277/1, 3, 70, 71, 72 FM; 51/352, 354, 908; 28/220, 272, 273

[56] References Cited

U.S. PATENT DOCUMENTS

| 3,477,218 | 11/1969 | Hawtin et al. | 57/289 |
| 3,742,695 | 7/1973 | Conrad | 57/247 X |
| 4,016,329 | 4/1977 | Matsuyama | 428/355 |
| 4,290,378 | 9/1981 | Wilkie | 57/246 X |
| 4,408,446 | 10/1983 | Wilkie | 57/246 |
| 4,452,160 | 6/1984 | Tajiri et al. | 57/247 X |
| 4,471,964 | 8/1984 | Kotzur | 277/72 R X |

*Primary Examiner*—Donald Watkins
*Attorney, Agent, or Firm*—Connolly and Hutz

[57] ABSTRACT

A method for sealing a passage (2) in a wall (3) for the unsupported transport of continuously accumulating tows (1), in which the pressure difference on both sides of the wall (3) is compensated by an additional gaseous medium (5).

14 Claims, 3 Drawing Sheets

SEALING OF APPARATUS WITH CONTINUOUS PRODUCT TRANSPORT

This invention relates to a method of sealing a passage for the transport of preferably endless products, such as fibers or film tapes, through a wall into a space which, through the presence of a vaporous or gaseous medium, has a different pressure from the external pressure at the wall and to an apparatus for carrying out this method.

The provision of fibers and film tapes with certain product properties requires such process steps as drawing, steaming or relaxation which are carried out in a closed chamber at steam temperatures of 100° to 150° C and under a pressure of 0.1 to 2.5 bar. On the other hand, these endless products generally accumulate continuously so that immediate further processing is as advantage both in economic and in qualitative terms. The entry and exit of the products into and from the chambers under excess pressure is accompanied by undesirable losses of steam into the surrounding atmosphere.

Roll or labyrinth seals are known in which the product is introduced into or removed from the chamber between more or less flexible gates. The disadvantages of seals such as these is that, apart from incomplete sealing and high wear, product damage above all can occur.

The object of the present invention is to provide a seal which, at the passage through a wall of a product transported continuously, preferably without contact, prevents a vapor or gas under excess pressure from flowing from one side to the other, largely avoids wear of the apparatus, provides for rapid adaptation to various working conditions, rules out product damage and provides for simple maintenance.

According to the invention, this object is achieved in that a stream of a vaporous or gaseous medium flowing substantially parallel to the transport path and in the direction of the higher pressure at the passage is introduced at a velocity which, by partial reduction over the remaining, spatially confined path, is subsequently converted into a pressure which substantially corresponds to the opposing pressure in the space, and in that, at the point of entry of the medium into the spatially confined path, the pressure is adjusted through the velocity in such a way that it substantially corresponds to the external pressure at the wall.

By virtue of the method according to the invention, an endless product may be transported through a solid wall between two spaces under different pressure- without coming into contact with any structural components and without the expensive treatment media, such as gases or vapors, escaping through this passage in consequence of the drop in pressure, thus avoiding high costs and serious pollution of the environment. It is possible even by introducing only small quantities of medium to prevent the treatment medium from escaping under the pressure differences of 0.1–5 bar and more especially of 1–2.5 bar which occur during production. If the flat tapes are to be prevented from coming into contact with the passage walls, widths of from 1.5 to 3 times the tap thickness have proved to be favorable, film tapes generally requiring narrower widths than fiber ribbons.

By acceleration of the medium in a Laval nozzle, velocities of from 1 to 3 Mach or even higher are reached at the point of entry so that it is possible on the one hand to establish a pressure corresponding to the external pressure (normally 1 atm . gauge) outside the passage and, on the other hand, by recovery of the kinetic energy to build up at the end of the passage the pressure required for treatment of the product in the chamber. When there is no longer a pressure drop relative to the adjacent spaces, the passage acts as a barrier.

By compression pulses in a convergent section following the point of entry with a shallow inclination of <5°, the pressure is recovered over a short distance with low losses in relation to the diffusor with high friction losses, the originally oblique compression pulses terminating in linear compression pulses at the latest in a following straight section up to 20 mm and more especially up to 14 mm in length before being stabilized after falling below the speed of sound in this section. The recovery of pressure is designed so that the efficiency of the converging flow is between 0.4 and 0.8 and preferably between 0.7 and 0.8. By efficiency is meant $$\eta = \frac{\ln \frac{P_2}{P_1}}{\frac{\chi}{\chi - 1} \ln \frac{\frac{2\chi}{\chi - 1} R \cdot T_R - v_2^2}{\frac{2\chi}{\chi - 1} R T_R - v_1^2}}$$

where $P_1$ and $P_2$ are the pressure and $v_1$ and $v_2$ the velocities at the beginning and end, respectively, of the convergent section while $T_r$ is the temperature at rest in the channel. The other two values R=gas constant and $\chi$=istropic exponent are used in the accepted sense.

At the end of the passage, the flow is stabilized in a diffusor with simultaneous adaptation to the pressure in the chamber, an angle of 5°–8° in rectangular cross-sections and an angle of 6°–10° in round cross-sections resulting in no adverse effect of the flow on the fiber tow.

If the medium is provided with a pulse flow $\dot{m}\cdot v_1$, where $\dot{m}$ is the mass flow and $v_1$ is the gas velocity at the point of entry, which is 0.4 to 0.8 and preferably 0.6 to 0.75 times the product of $A_3 \cdot P_4$, where $A_3$ is the smallest cross-section of the diffusor and $P_4$ is the pressure of the treatment medium in the chamber, it is possible, for example where the other data are predetermined, to determine a cross-section $A_3$ in which a satisfactory flow can develop with optimal pressure conversion.

The use for sealing of a medium which is the same as the treatment medium used in the chamber avoids mixing problems in the chamber. The recovery of the medium for circulation is simplified, affording significant advantages in the case of environment-polluting media.

In addition, it is possible by using media having a higher molecular weight than the treatment medium to increase the pulse forces so that even small quantities or relatively low velocities of the medium are sufficient for sealing.

By sealing in two stages, it is possible first to increase the pressure in an air lock using an inexpensive medium and then to block the second passage using a medium which is used to treat the products in the chamber in only small quantities by virtue of the small pressure difference.

In an apparatus according to the invention, the object as stated above is achieved in that inlets for the medium are arranged in the peripheral zone of the passage in the wall, pointing in the direction of the passage which is divergent at least in its final section.

The apparatus according to the invention provides for satisfactory sealing through an air stream in which the product can be guided without wear through the wall of a closed chamber without coming into contact with fixed components and without the treatment medium present under relatively high pressure in the chamber being able to penetrate through the passage. The internal dimensions of the passage may be adjusted to meet practical requirements. For example, they depend on whether the tape is smooth or filmy. One particular advantage lies in the relatively short construction which can be built into any wall. In particular, maintenance is very simple by virtue of the absence of turning parts.

Using the claimed Laval nozzle, it is possible to produce any desired sonic or supersonic velocity. The inlets open into a convergent section which, through compression pulses, provides for low-loss, rapid conversion of the kinetic energy into the required range while the medium is rapidly stabilized in the short, adjoining section with the same cross-section.

The medium used may be steam, an inert gas (nitrogen, noble gases) or any other gas (air, forming gas) under a pressure of 1-10 atms. gauge, the medium preferably used being one which may also be used for the continuous treatment of fibrous products, such as drawing, relaxing, fixing or shaping.

Examples of the invention are illustrated in the accompanying drawings and are described in detail hereinafter. In the drawings:

FIG. 1 diagrammatically illustrates a plant with passages.

Figure 1:
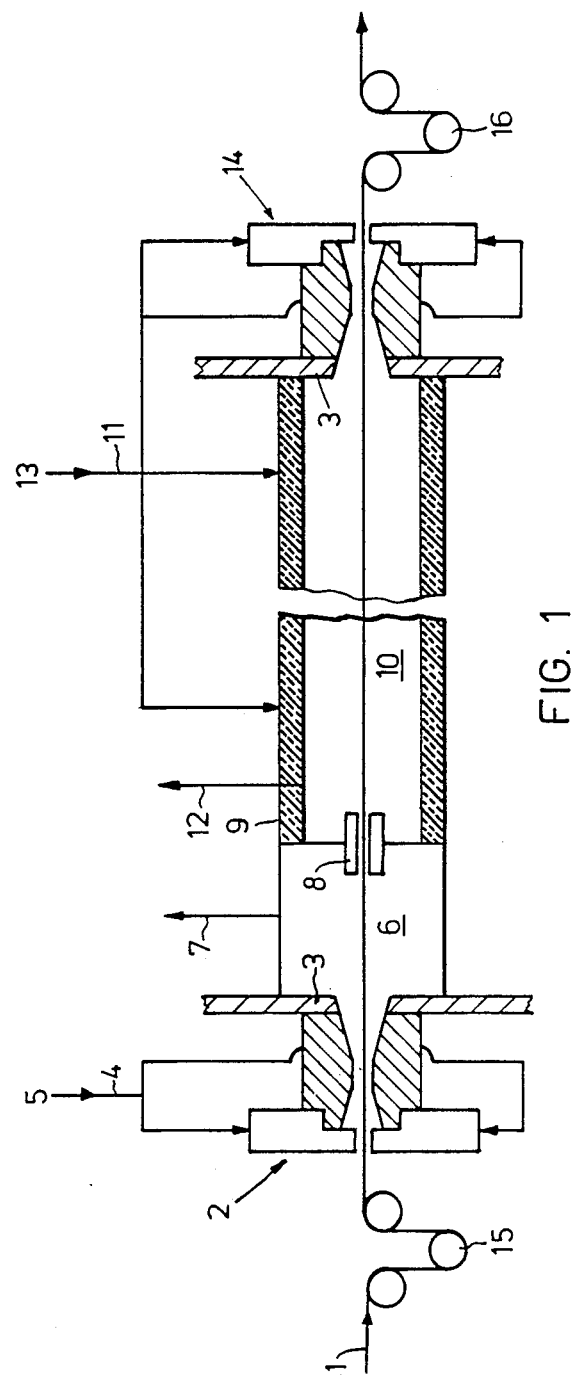

FIG. 1 diagrammatically illustrates a plant for the treatment of products 1, such as tows, which includes a passage 2 in a wall 3 with inlets 4 for air as the medium 5, an antechamber 6 with an outlet 7 for the air used as the medium 5, an air lock 8, a space 10 protected by heat insulation 9, a chamber with an inlet 11 and an outlet 12 for the treatment medium (steam) 13 and a passage 14 with an inlet 11 for steam.

The tow 1 is introduced freely by feed rollers 15 through the passage 2 into the antechamber 6 from which it passes through the air lock 8 into the chamber 10 where it is treated inter alia with the medium 13. The tow is removed without support by the take-off rolls 16 via the passage 14.

Figure 2:
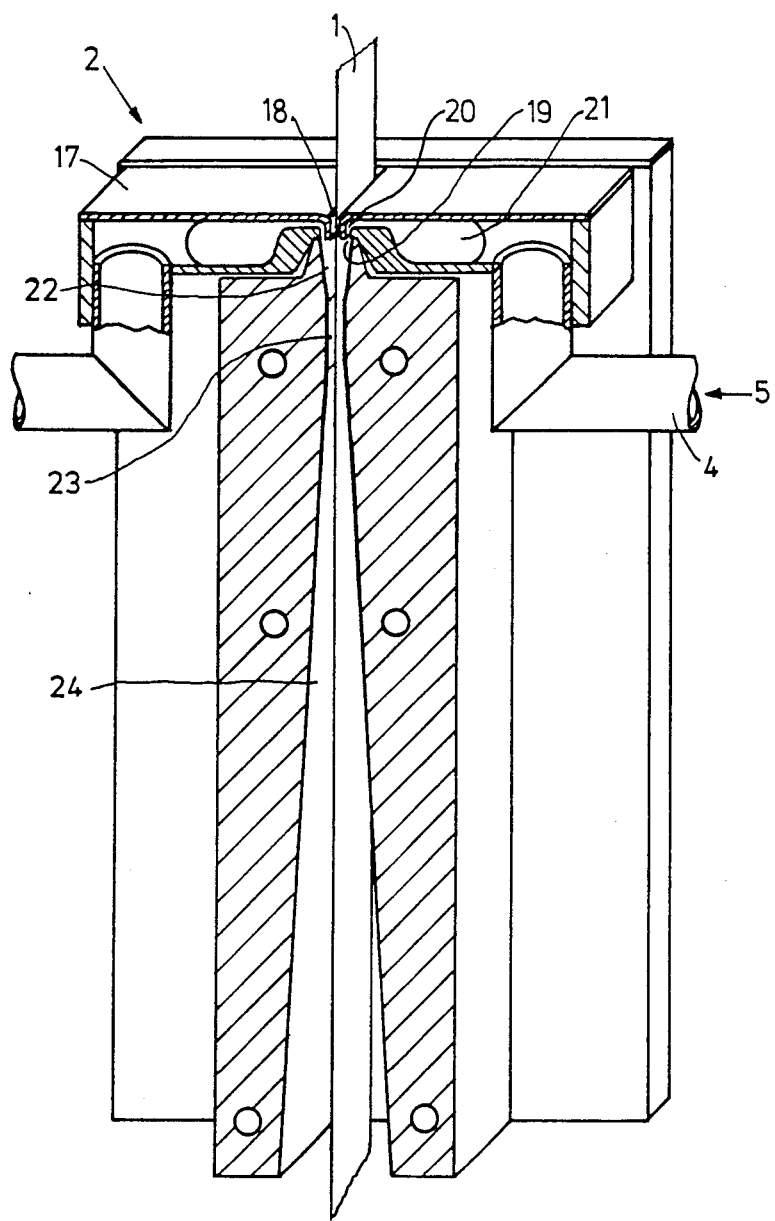
FIG. 2 is a section through a passage.

A passage 2 is shown in detail in FIG. 2. The passage consists of a head 17 with an elongate slot 18 for the centrally travelling tow 1 which, at its edges, comprises openings 19 for inlets 20 in the form of Laval nozzles directed towards the chamber 10 substantially parallel to the main axis of symmetry for generating the supersonic velocity which are fed with medium 5 from a reservoir (not shown) via distributors 21 and feed channels 4. The slot 18 with inlets 20 on both sides opens into a convergent section 22 for the compression pulses which is in turn adjoined by a straight section 23 of uniform cross-section for stabilizing the subsonic flow which in turn is followed by a diffusor 24.

Figure 3:
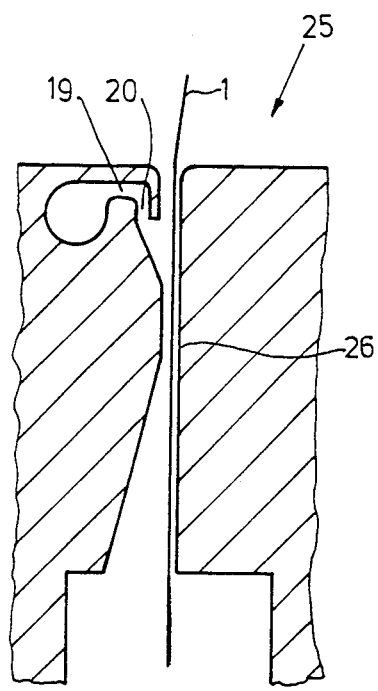
FIG. 3 shows part of a passage.

FIG. 3 shows an asymmetrical passage 25 in which the the tow 1 is directly adjacent one side 26 of the passage 25 which does not contain an inlet 20.

Figure 4:
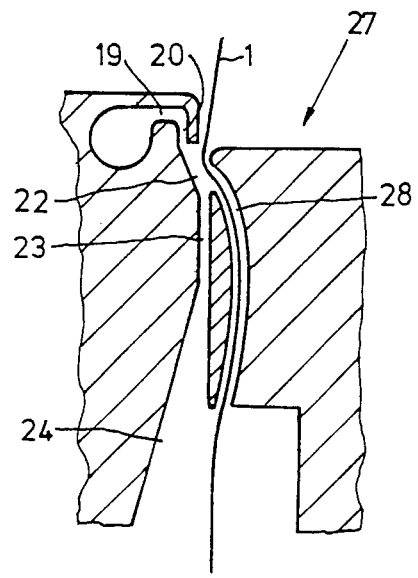
FIG. 4 shows part of a passage.

FIG. 4 also shows an asymmetrical passage 27 in which the delicate tow 1 is guided beyond a certain point in a separate channel 28, the actual passage 27 as usual acting as a seal and at the same time being used for the introduction of medium 5 serving as the treatment medium 13.

We claim:

1. A method for sealing passage of a continuous endless product such as fibers, webs, or tapes into a treatment chamber in which the endless product if treated under excess pressure relevant to ambient pressure, the endless product being transported through a sealing channel connected to the treatment chamber, the method comprising introducing a gas at the entry of the sealing channel, maintaining therein a gas flow parallel with the endless product at a pressure differential, the pressure prevailing at the exit of the sealing channel substantially corresponding to the excess pressure in the chamber, discharging the gas at the exit of the channel, and adjusting the streaming velocity of the gas at the entry of the channel in such a manner that the pressure at the entry is nearly equal to ambient pressure.

2. A method as in claim 1 wherein the gas is introduced into the sealing channel by Laval nozzles at supersonic speed.

3. A method as in claim 2 wherein the gas is accelerated to Mach 1 to 2.

4. A method as in claim 3 wherein the gas is accelerated to Mach 1.5 to 2.5.

5. A method as in claim 1 wherein a pulse flow $m \cdot v_1$ where m is the mass flow and $v_1$ is the gas velocity, is introduced at the entry of the sealing channel and which is 0.4 to 0.8 and preferably 0.6 to 0.75 times the product of $A_3 \cdot P_2$, where $A_3$ is the smallest cross-section of the sealing channel and $P_2$ is the excess pressure of the medium in the treatment chamber.

6. A method as in claim 1 wherein the gas used for sealing is the treatment medium used in the chamber.

7. A method as in claim 1 wherein the gas used for sealing has a higher density than the treatment medium used in the chamber.

8. An apparatus for sealing passage of a continuous endless product such as fibres, webs, or tapes into a treatment chamber in which the endless product is treated under excess pressure relevant to ambient pressure, the apparatus comprising a treatment chamber, a sealing channel connected to the treatment chamber, the sealing channel having an entry, gas introduction nozzles at the entry, the nozzles being arranged at the periphery of the channel and pointing substantially parallel to the direction of flow through the channel, and an end portion of the channel having a diverging cross-section acting as a diffusor for expanding the gas flow.

9. An apparatus as in claim 8 wherein the gas introduction nozzles are Laval nozzles.

10. An apparatus as in claim 8 wherein the portion of the sealing channel downstream of the nozzles has a converging cross-section.

11. An apparatus as in claim 10 including a channel portion having constant cross-section between the diffuser and the converging portion.

12. An apparatus as in claim 11 wherein the length of the channel portion having constant cross-section is less than 20 mm, preferably less than 14 mm.

13. An apparatus as in claim 8 wherein the diffusor has a rectangular cross-section with an angle of expansion of 5° to 8°.

14. An apparatus as in claim 8 wherein the diffusor has a circular cross-section with an angle of expansion of 6° to 10°.

* * * * *